(12) United States Patent
Liu (10) Patent No.: US 10,402,433 B2
(45) Date of Patent: Sep. 3, 2019

(54) METHOD AND APPARATUS FOR RECOMMENDING ANSWER TO QUESTION BASED ON ARTIFICIAL INTELLIGENCE

(71) Applicant: BEIJING BAIDU NETCOM SCIENCE AND TECHNOLOGY CO., LTD., Beijing (CN)

(72) Inventor: Qiongqiong Liu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/852,637

(22) Filed: Dec. 22, 2017

(65) Prior Publication Data

US 2018/0373782 A1 Dec. 27, 2018

(30) Foreign Application Priority Data

Jun. 27, 2017 (CN) .......................... 2017 1 0500460

(51) Int. Cl.
*G06F 17/27* (2006.01)
*G06F 16/332* (2019.01)
*G06N 5/04* (2006.01)
*G06N 5/02* (2006.01)
*G06F 16/2452* (2019.01)
*G06F 16/903* (2019.01)

(52) U.S. Cl.
CPC .... *G06F 16/3329* (2019.01); *G06F 16/24522* (2019.01); *G06F 16/90335* (2019.01); *G06F 17/2705* (2013.01); *G06F 17/277* (2013.01); *G06F 17/279* (2013.01); *G06F 17/2785* (2013.01); *G06F 17/2795* (2013.01); *G06N 5/02* (2013.01); *G06N 5/04* (2013.01)

(58) Field of Classification Search
CPC .......... G06F 17/30654; G06F 17/3043; G06F 17/2705; G06F 17/2795; G06F 17/2785; G06N 5/04
USPC ....................................... 704/9, 10; 709/219
See application file for complete search history.

(56) References Cited

U.S. PATENT DOCUMENTS 6,766,320 B1 * 7/2004 Wang ..................... G06F 16/313
2003/0225862 A1 * 12/2003 Watanabe .............. G06Q 30/02
709/219
2018/0342233 A1 * 11/2018 Li et al. .................. G10L 15/01

* cited by examiner

*Primary Examiner* — Md S Elahee
(74) *Attorney, Agent, or Firm* — Hodgson Russ LLP (57) ABSTRACT

Provided are a method and an apparatus for recommending an answer to a question based on artificial intelligence and a computer device. The method includes: receiving a query being a question; matching the query to questions having answers in a question and answer repository; calculating a semantic similarity between the query and each of the questions having answers in the question and answer repository if no question in the question and answer repository is exactly matched to the query; determining whether a question with a semantic similarity to the query greater than a preset threshold exists in the question and answer repository; if yes, recommending the answer to the question with the semantic similarity to the query greater than the preset threshold as an answer to the query.

9 Claims, 8 Drawing Sheets

METHOD AND APPARATUS FOR RECOMMENDING ANSWER TO QUESTION BASED ON ARTIFICIAL INTELLIGENCE

CROSS-REFERENCE TO RELATED APPLICATION

This application claims priority to and benefits of Chinese Patent Application Serial No. 201710500460.4, filed with the State Intellectual Property Office of P. R. China on Jun. 27, 2017, the entire content of which is incorporated herein by reference.

FIELD

The present disclosure relates to the field of retrieval technology, and more particularly to a method and an apparatus for recommending an answer to a question based on artificial intelligence.

BACKGROUND

With the rapid development of the Internet, operation manners of some question-answering systems have been gradually changed from a manner with excessive human participations to an automatic manner or an automatic-human combined manner, such that a part of questions may be solved in the automatic question and answer recommending manner, thus reducing human participations and releasing a fast response to users' requirements.

In the related art, an answer is generally recommended according to a word matching degree between a query and a question in a known repository. However, due to the simple matching based on the words, in such a method, a misunderstanding problem may be caused and meaningless colloquial expressions cannot be distinguished, and thus the answer recommended cannot meet the requirements of the users, resulting in bad user experience.

SUMMARY

Embodiments of the present disclosure provide a method for recommending an answer to a question based on artificial intelligence. The method includes: receiving a query being a question; matching the query to questions having answers in a question and answer repository; calculating a semantic similarity between the query and each of the questions having answers in the question and answer repository if no question in the question and answer repository is exactly matched to the query; determining whether a question with a semantic similarity to the query greater than a preset threshold exists in the question and answer repository; if yes, recommending the answer to the question with the semantic similarity to the query greater than the preset threshold as an answer to the query.

Embodiments of the present disclosure provide an apparatus for recommending an answer to a question based on artificial intelligence. The apparatus includes: one or more processors; a memory; one or more software modules stored in the memory and executable by the one or more processors, and including: a receiving module configured to receive a query being a question; a matching module configured to match the query received by the receiving module to questions having answers in a question and answer repository; a calculating module configured to calculate a semantic similarity between the query and each of the questions having answers in the question and answer repository if no question in the question and answer repository is exactly matched to the query; a determining module configured to determine whether a question with a semantic similarity to the query greater than a preset threshold exists in the question and answer repository; a recommending module configured to recommend the answer to the question with the semantic similarity to the query greater than the preset threshold as an answer to the query if the question with the semantic similarity to the query greater than the preset threshold exists in the question and answer repository.

Embodiments of the present disclosure provide a non-temporary computer-readable storage medium having stored therein computer programs that, when executed by a processor, causes the processor to perform the method described above.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Reference will be made in detail to embodiments of the present disclosure. The embodiments described herein with reference to drawings are explanatory, illustrative, and configured to generally understand the present disclosure. The embodiments shall not be construed to limit the present disclosure. The same or similar elements and the elements having same or similar functions are denoted by like reference numerals throughout the descriptions.

Artificial Intelligence (AI) is a new technological science that studies and develops theories, methods, techniques and application systems for simulating, extending and expanding human intelligence. AI is a branch of computer science, seeking to understand the essence of intelligence and to produce a new type of intelligent machine that responds in a manner similar to human intelligence. Researches of AI may include robotics, speech recognition, image recognition, natural language processing and expert systems.

In embodiments of a first aspect of the present disclosure, a method for recommending an answer to a question based on artificial intelligence is provided, including:

receiving a query being a question;

matching the query to questions having answers in a question and answer repository;

calculating a semantic similarity between the query and each of the questions having answers in the question and answer repository if no question in the question and answer repository is exactly matched to the query;

determining whether a question with a semantic similarity to the query greater than a preset threshold exists in the question and answer repository;

if yes, recommending the answer to the question with the semantic similarity to the query greater than the preset threshold as an answer to the query.

In the method for recommending an answer to a question based on artificial intelligence according to embodiments of the present disclosure, after the query is received, the query is matched to questions having answers in the question and answer repository, the semantic similarity between the query and each of the questions having answers in the question and answer repository is calculated if no question in the question and answer repository is exactly matched to the query, it is determined whether a question with a semantic similarity to the query greater than a preset threshold exists in the question and answer repository, if yes, the answer to the question with the semantic similarity to the query greater than the preset threshold is recommended as an answer to the query, thus realizing the recommendation of the answer to the question according to the semantic similarity, reducing a risk of misunderstanding, and reducing interference of meaningless colloquial expressions.

In an embodiment of the present disclosure, after determining whether the question with the semantic similarity to the query greater than the preset threshold exists in the question and answer repository, the method further includes:

if no question in the question and answer repository has a semantic similarity to the query greater than the preset threshold, recommending a preset number of questions in the question and answer repository in a descending order of semantic similarities to the query, such that a question having a most similar meaning to the query is selected from the preset number of questions;

recommending an answer to the selected question.

In an embodiment of the present disclosure, before calculating the semantic similarity between the query and each of the questions having answers in the question and answer repository, the method further includes:

performing a word segmentation on the query to acquire word segments of the query;

performing an inverted zippering on the word segments of the query in the question and answer repository in combination with a synonym repository, a modifier repository and a stop word repository to acquire a retrieve expression;

processing the retrieve expression with an inverted index and a k-channel mergence to acquire candidate similar questions in the question and answer repository.

In an embodiment of the present disclosure, calculating the semantic similarity between the query and each of the questions having answers in the question and answer repository includes:

calculating a semantic similarity between the query and each of the candidate similar questions in the question and answer repository according to a similarity calculating model.

In an embodiment of the present disclosure, before calculating the semantic similarity between the query and each of the candidate similar questions in the question and answer repository according to the similarity calculating model, the method further includes:

collecting a query pair;

processing the query pair to generate a training corpus;

extracting characteristics from the training corpus in combination with the synonym repository, the modifier repository and the stop word repository to acquire a repository characteristic, a semantic similarity characteristic, a literal similarity characteristic and a structural similarity characteristic of the training corpus;

inputting the repository characteristic, the semantic similarity characteristic, the literal similarity characteristic and the structural similarity characteristic of the training corpus into a gradient boosting decision tree (GBDT) model and performing a training on the GBDT model by an intelligent learning algorithm, so as to acquire the similarity calculating model.

In an embodiment of the present disclosure, after matching the query to questions having answers in the question and answer repository, the method further includes:

recommending the answer to a question exactly matched to the query if the question exactly matched to the query exists in the question and answer repository.

In embodiments of a second aspect of the present disclosure, an apparatus for recommending an answer to a question based on artificial intelligence is provided, including:

one or more processors;

a memory;

one or more software modules stored in the memory and executable by the one or more processors, and including:

a receiving module configured to receive a query being a question;

a matching module configured to match the query received by the receiving module to questions having answers in a question and answer repository;

a calculating module configured to calculate a semantic similarity between the query and each of the questions having answers in the question and answer repository if no question in the question and answer repository is exactly matched to the query;

a determining module configured to determine whether a question with a semantic similarity to the query greater than a preset threshold exists in the question and answer repository;

a recommending module configured to recommend the answer to the question with the semantic similarity to the query greater than the preset threshold as an answer to the query if the question with the semantic similarity to the query greater than the preset threshold exists in the question and answer repository.

In an embodiment of the present disclosure, the recommending module is further configured to:

recommend a preset number of questions in the question and answer repository in a descending order of semantic similarities to the query, such that a question having a most similar meaning to the query is selected from the preset number of questions if no question in the question and answer repository has a semantic similarity to the query greater than the preset threshold; and recommend an answer to the selected question.

In an embodiment of the present disclosure, the apparatus further includes:

a word segmentation module configured to perform a word segmentation on the query to acquire word segments of the query before the semantic similarity between the query and each of the questions having answers in the question and answer repository is calculated by the calculating module;

an inverted zippering module configured to perform an inverted zippering on the word segments of the query acquired by the word segmentation module in the question and answer repository in combination with a synonym repository, a modifier repository and a stop word repository to acquire a retrieve expression;

a candidate acquiring module configured to process the retrieve expression acquired by inverted zippering module with an inverted index and a k-channel mergence to acquire candidate similar questions in the question and answer repository.

In an embodiment of the present disclosure, the apparatus further includes:

a word segmentation module configured to perform a word segmentation on the query to acquire word segments of the query before the semantic similarity between the query and each of the questions having answers in the question and answer repository is calculated by the calculating module;

an inverted zippering module configured to perform an inverted zippering on the word segments of the query acquired by the word segmentation module in the question and answer repository in combination with a synonym repository, a modifier repository and a stop word repository to acquire a retrieve expression;

a candidate acquiring module configured to process the retrieve expression acquired by inverted zippering module with an inverted index and a k-channel mergence to acquire candidate similar questions in the question and answer repository.

In an embodiment of the present disclosure, the calculating module is specifically configured to:

calculate a semantic similarity between the query and each of the candidate similar questions in the question and answer repository according to a similarity calculating model.

In an embodiment of the present disclosure, the apparatus further includes:

a collecting module configured to collect a query pair before the semantic similarity between the query and each of the candidate similar questions in the question and answer repository is calculated by the calculating module according to the similarity calculating model;

a generating module configured to process the query pair collected by the collecting module to generate a training corpus;

a characteristic extracting module configured to extract characteristics from the training corpus in combination with the synonym repository, the modifier repository and the stop word repository to acquire a repository characteristic, a semantic similarity characteristic, a literal similarity characteristic and a structural similarity characteristic of the training corpus;

a training module configured to input the repository characteristic, the semantic similarity characteristic, the literal similarity characteristic and the structural similarity characteristic of the training corpus extracted by the characteristic extracting module into a GBDT model and perform a training on the GBDT model by an intelligent learning algorithm, so as to acquire the similarity calculating model.

In an embodiment of the present disclosure, the recommending module is further configured to:

recommend the answer to a question exactly matched to the query if the question exactly matched to the query exists in the question and answer repository after the query is matched to questions having answers in the question and answer repository by the matching module.

In embodiments of a first aspect of the present disclosure, a non-temporary computer-readable storage medium having stored therein computer programs that, when executed by a processor, causes the processor to perform a method for recommending an answer to a question based on artificial intelligence. The method includes:

receiving a query being a question;

matching the query to questions having answers in a question and answer repository;

calculating a semantic similarity between the query and each of the questions having answers in the question and answer repository if no question in the question and answer repository is exactly matched to the query;

determining whether a question with a semantic similarity to the query greater than a preset threshold exists in the question and answer repository;

if yes, recommending the answer to the question with the semantic similarity to the query greater than the preset threshold as an answer to the query.

Figure 1:
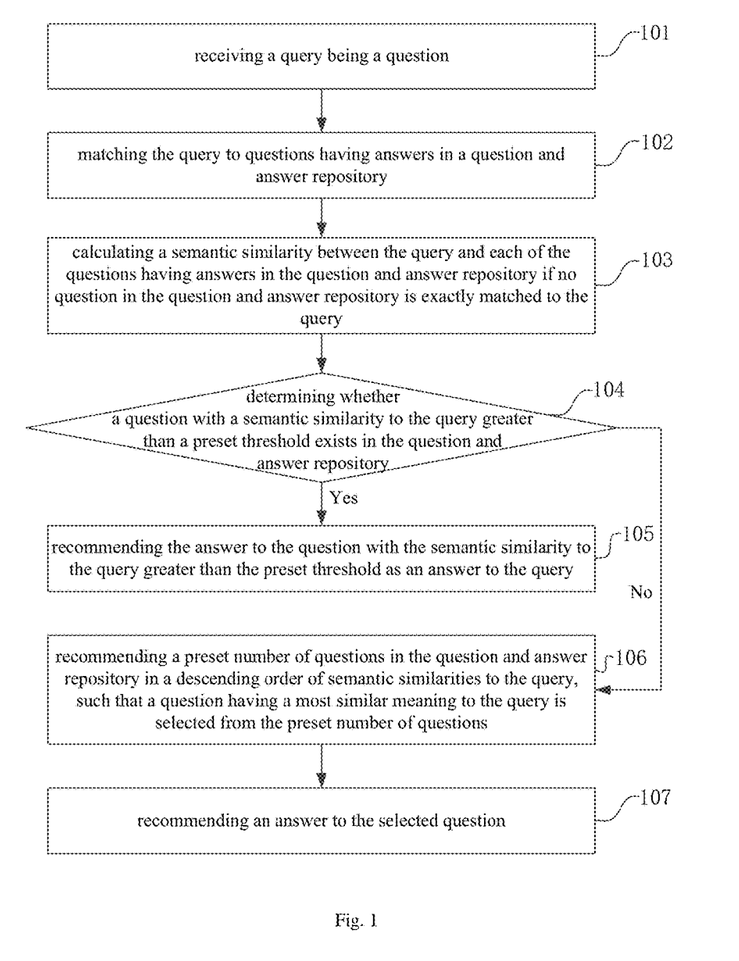
FIG. 1 is a flow chart of a method for recommending an answer to a question based on artificial intelligence according to an embodiment of the present disclosure.

FIG. 1 is a flow chart of a method for recommending an answer to a question based on artificial intelligence according to an embodiment of the present disclosure.

As shown in FIG. 1, the method may include the following blocks.

In block 101, a query being a question is received.

Specifically, a user may input the query in a form of text, voice or picture, which is not limited herein.

In block 102, the query is matched to questions having answers in a question and answer repository.

In the description of the embodiments of the present disclosure, a repository refers to such a knowledge cluster in a knowledge engineering that is structured, easy to operate and utilize, comprehensive and organized, or refers to such a set of interrelated knowledge snippets that is direct at problem solving requirements in a certain (or some) field(s) and is stored, organized, managed and used in a certain (or some) knowledge representation mode(s) in a memory of computer. These knowledge snippets may include theoretical knowledge, factual data or heuristic knowledge gained from expert experience in the related art, such as definitions, theorems and algorithms, and common-sense knowledge in a certain art.

In block 103, a semantic similarity between the query and each of the questions having answers in the question and answer repository is calculated if no question in the question and answer repository is exactly matched to the query.

In block 104, it is determined whether a question with a semantic similarity to the query greater than a preset threshold exists in the question and answer repository. If yes, block 105 is performed, otherwise, block 106 is performed.

Specifically, the preset threshold described above may be determined according to system properties and/or implementation requirements, and is not limited herein. For example, the preset threshold may be 0.8.

In block 105, the answer to the question with the semantic similarity to the query greater than the preset threshold is recommended as an answer to the query.

In block 106, a preset number of questions in the question and answer repository in a descending order of semantic similarities to the query are recommended, such that a question having a most similar meaning to the query is selected from the preset number of questions.

In block 107, an answer to the selected question is recommended.

In the method for recommending an answer to a question based on artificial intelligence according to embodiments of the present disclosure, after the query is received, the query is matched to questions having answers in the question and answer repository, the semantic similarity between the query and each of the questions having answers in the question and answer repository is calculated if no question in the question and answer repository is exactly matched to the query, it is determined whether a question with a semantic similarity to the query greater than the preset threshold exists in the question and answer repository, if yes, the answer to the question with the semantic similarity to the query greater than the preset threshold is recommended as an answer to the query, if no question in the question and answer repository has a semantic similarity to the query greater than the preset threshold, the preset number of questions in the question and answer repository are recommended in the descending order of semantic similarities to the query, such that the question having a most similar meaning to the query is selected from the preset number of questions, and the answer to the selected question is recommended, thus realizing the recommendation of the answer to the question according to the semantic similarity, reducing a risk of misunderstanding, and reducing interference of meaningless colloquial expressions.

Figure 2:
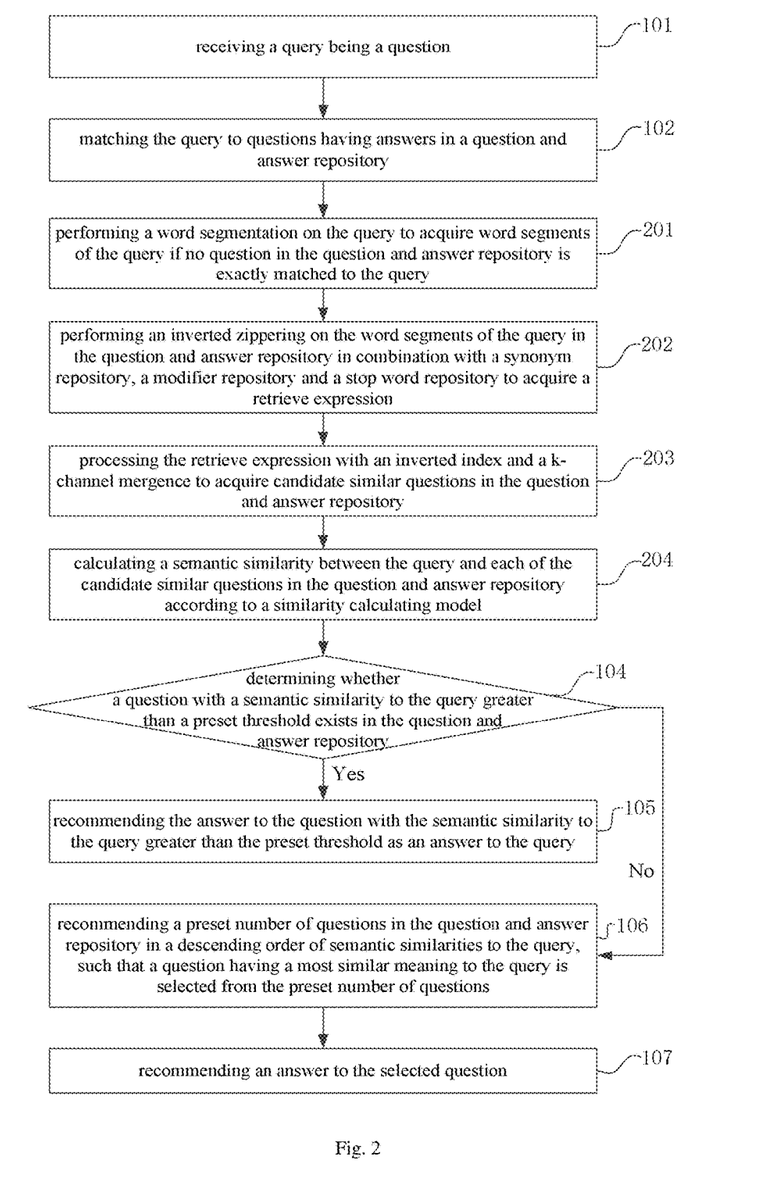
FIG. 2 is a flow chart of a method for recommending an answer to a question based on artificial intelligence according to another embodiment of the present disclosure.

FIG. 2 is a flow chart of a method for recommending an answer to a question based on artificial intelligence according to another embodiment of the present disclosure.

As shown in FIG. 2, in step 103 shown in FIG. 1, before calculating the semantic similarity between the query and each of the questions having answers in the question and answer repository, the method further includes the following blocks.

In block 201, if no question in the question and answer repository is exactly matched to the query, a word segmentation is performed on the query to acquire word segments of the query.

In block 202, an inverted zippering is performed on the word segments of the query in the question and answer repository in combination with a synonym repository, a modifier repository and a stop word repository to acquire a retrieve expression.

In block 203, the retrieve expression is processed with an inverted index and a k-channel mergence to acquire candidate similar questions in the question and answer repository.

Figure 3:
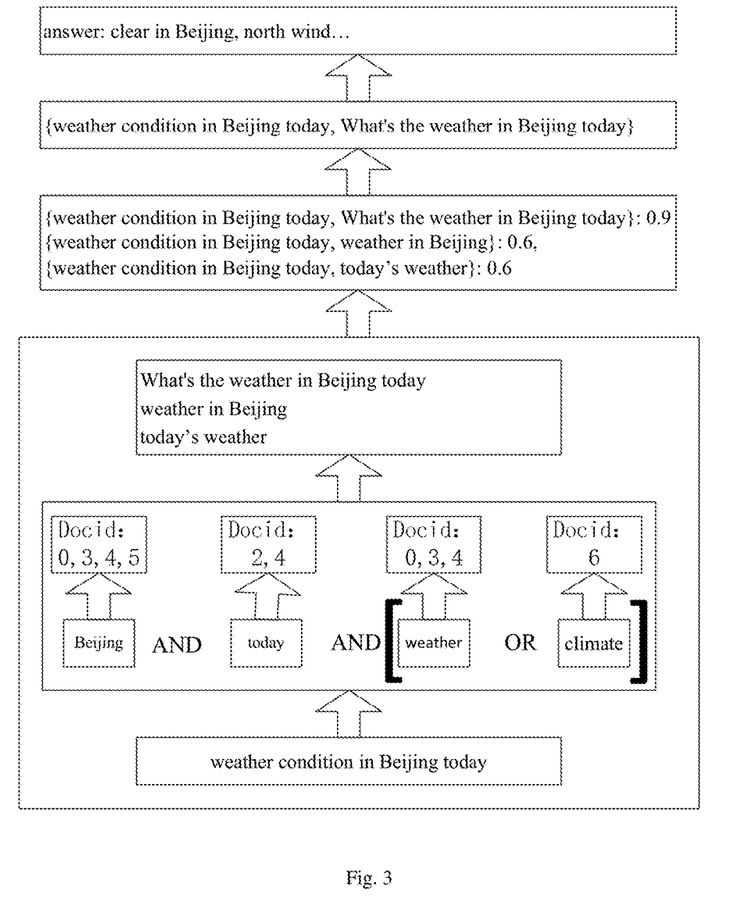
FIG. 3 is a schematic diagram showing an example of a method for recommending an answer to a question based on artificial intelligence.

FIG. 3 is a schematic diagram showing an example of a method for recommending an answer to a question based on artificial intelligence.

As shown in FIG. 3, it is assumed that an answer to "What's the weather in Beijing today" has already in the repository. When a query "weather condition in Beijing today" is inputted by a user, the word segmentation may be performed on the query firstly, thus acquiring word segments "weather", "condition", "in", "Beijing" and "today" included in the query, and a synonym "climate" of the word segment "weather" may be acquired from the synonym repository, such that a query related to "climate" may also be taken as a candidate when extracting candidate similar questions by performing inverted zippering. Moreover, it can be known from the modifier repository that when "condition" occurs after "weather", it can be omitted, such that "condition" does not involve in extracting candidate similar questions by performing inverted zippering. In addition, it can be known from the stop word repository that "in" is a stop word, which is meaningless for semantic expression such that "in" does not involve in extracting candidate similar questions by performing inverted zippering either. Therefore, the inverted zippering is performed on the above word segments of the query in combination with the synonym repository, the modifier repository and the stop word repository to acquire a retrieve expression "Beijing AND today AND [weather OR climate]". The retrieve expression may be processed with the inverted index and the k-channel mergence to acquire candidate similar questions in the question and answer repository. In this example, the candidate similar questions in the question and answer repository may be "What's the weather in Beijing today", "weather in Beijing" and "today's weather".

On above basis, block 203 may include a block 204: calculating a semantic similarity between the query and each of the candidate similar questions in the question and answer repository according to a similarity calculating model.

Specifically, the semantic similarity between the query and each of the candidate similar questions in the question and answer repository may be calculated according to the similarity calculating model. For example, as shown in FIG. 3, semantic similarity between the query and each of the candidate similar questions in the question and answer repository is {weather condition in Beijing today, What's the weather in Beijing today}: 0.9, {weather condition in Beijing today, weather in Beijing}: 0.6, or {weather condition in Beijing today, today's weather}: 0.6.

Accordingly, only semantic similarity between the query "weather condition in Beijing today" and the question "What's the weather in Beijing today" is greater than 0.8, and thus an answer to "What's the weather in Beijing today" is recommended to the user as the answer to "weather condition in Beijing today".

Figure 4:
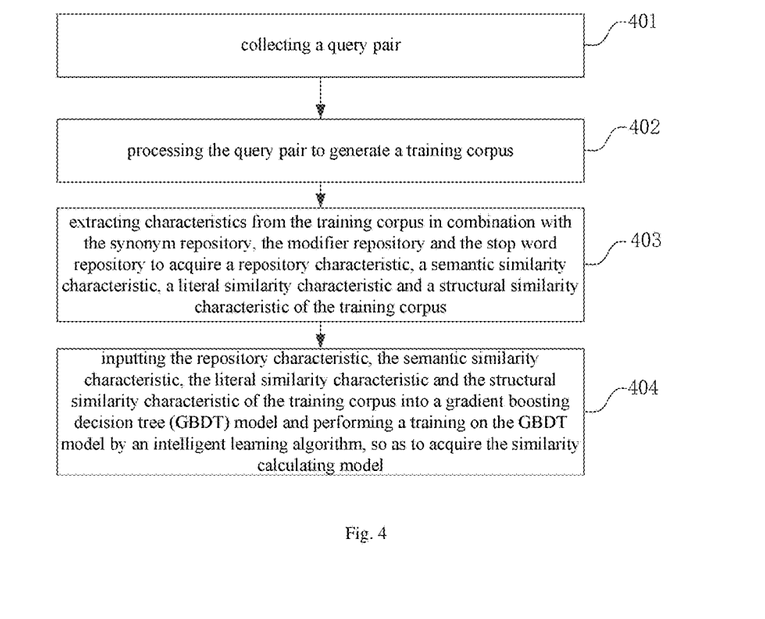
FIG. 4 is a flow chart of a method for recommending an answer to a question based on artificial intelligence according to a further embodiment of the present disclosure.

FIG. 4 is a flow chart of a method for recommending an answer to a question based on artificial intelligence according to a further embodiment of the present disclosure.

As shown in FIG. 4, in the method for recommending an answer to a question based on artificial intelligence according to an embodiment of the present disclosure shown in FIG. 2, before block 204, the method may further include the following blocks.

In block 401, a query pair is collected.

In this embodiment of the present disclosure, the collected query pair may include similar query pairs such as "weather" and "climate", may also include dissimilar query pairs such as "weather" and "rectangle", in other words, the collected query pair may include both positive examples and negative examples, so as to be used to train the similarity calculating model.

In block 402, the query pair is processed to generate a training corpus.

In block 403, characteristics are extracted from the training corpus in combination with the synonym repository, the modifier repository and the stop word repository to acquire a repository characteristic, a semantic similarity characteristic, a literal similarity characteristic and a structural similarity characteristic of the training corpus.

In block 404, the repository characteristic, the semantic similarity characteristic, the literal similarity characteristic and the structural similarity characteristic of the training corpus are inputted into a gradient boosting decision tree (GBDT) model and a training is performed on the GBDT model by an intelligent learning algorithm, so as to acquire the similarity calculating model.

Specifically, the intelligent learning algorithm may be a bm25 algorithm, a machine learning algorithm or other algorithms, which is not limited herein.

In such a manner, after block 203, i.e., after candidate similar questions in the question and answer repository are acquired, in block 204, the semantic similarity between the query and each of the candidate similar questions in the question and answer repository may be calculated according to the similarity calculating model acquired by training as described above.

Figure 5:
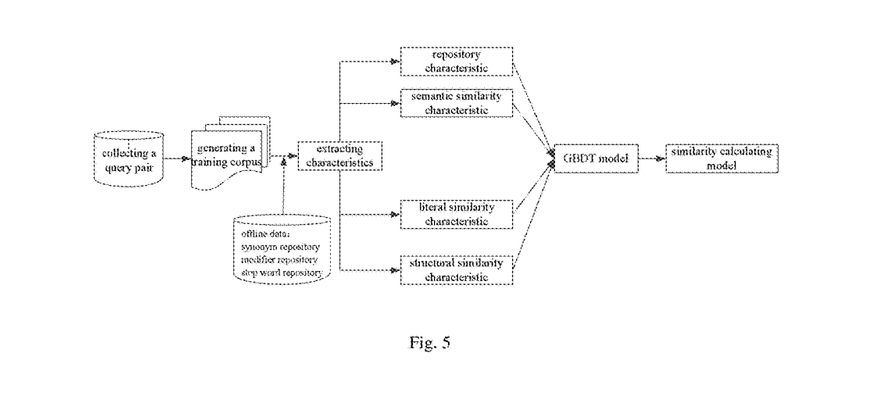
FIG. 5 is a schematic diagram showing a training process of a similarity calculating model in a method for recommending an answer to a question based on artificial intelligence according to an embodiment of the present disclosure.

The training process of the similarity calculating model as described above is as shown in FIG. 5, and FIG. 5 is a schematic diagram showing the training process of the similarity calculating model in a method for recommending an answer to a question based on artificial intelligence according to an embodiment of the present disclosure.

Figure 6:
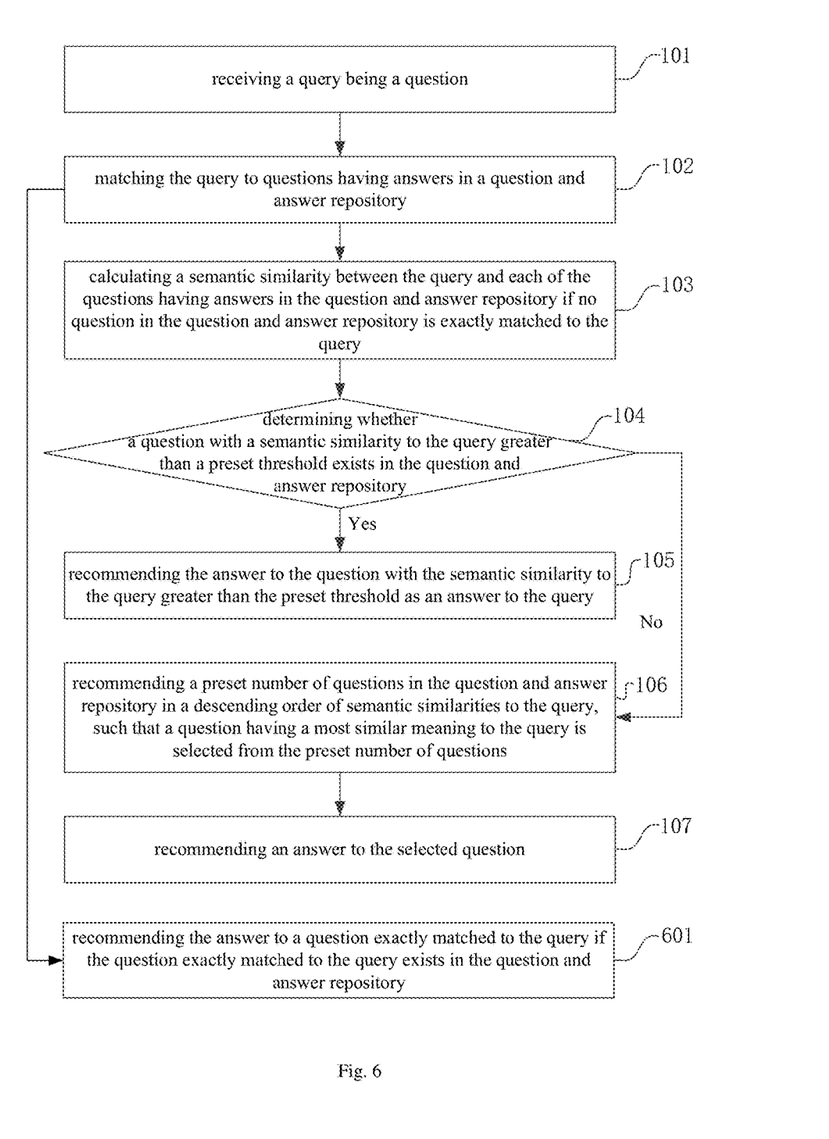
FIG. 6 is a flow chart of a method for recommending an answer to a question based on artificial intelligence according to yet another embodiment of the present disclosure.

FIG. 6 is a flow chart of a method for recommending an answer to a question based on artificial intelligence according to yet another embodiment of the present disclosure.

As shown in FIG. 6, in the embodiment shown in FIG. 1, after block 102, the method may further include block 601: recommending the answer to a question exactly matched to the query if the question exactly matched to the query exists in the question and answer repository.

With the method for recommending an answer to a question based on artificial intelligence according to embodiments of the present disclosure, an answer may be recommended according to the semantic similarity, the risk of misunderstanding is reduced and interference of meaningless colloquial expressions is reduced.

Figure 7:
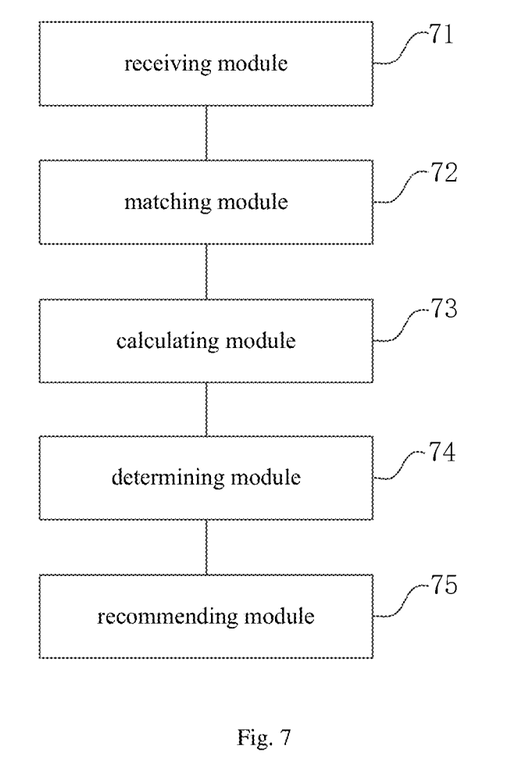
FIG. 7 is a block diagram showing an apparatus for recommending an answer to a question based on artificial intelligence according to an embodiment of the present disclosure.

FIG. 7 is a block diagram showing an apparatus for recommending an answer to a question based on artificial intelligence according to an embodiment of the present disclosure, and the apparatus may be used as a search engine or part of the search engine to realize the method for recommending an answer to a question based on artificial intelligence according to an embodiment of the present disclosure.

As shown in FIG. 7, the apparatus described above may include one or more processors; a memory; one or more software modules stored in the memory and executable by the one or more processors, and including: a receiving module 71, a matching module 72, a calculating module 73, a determining module 74 and a recommending module 75.

Specifically, the receiving module 71 is configured to receive a query being a question.

The matching module 72 is configured to match the query received by the receiving module 71 to questions having answers in a question and answer repository.

The calculating module 73 is configured to calculate a semantic similarity between the query and each of the questions having answers in the question and answer repository if no question in the question and answer repository is exactly matched to the query.

The determining module 74 is configured to determine whether a question with a semantic similarity to the query greater than a preset threshold exists in the question and answer repository. Specifically, the preset threshold described above may be determined according to system properties and/or implementation requirements, and is not limited herein. For example, the preset threshold may be 0.8.

The recommending module 75 is configured to recommend the answer to the question with the semantic similarity to the query greater than the preset threshold as an answer to the query if the question with the semantic similarity to the query greater than the preset threshold exists in the question and answer repository.

The recommending module 75 is further configured to recommend a preset number of questions in the question and answer repository in a descending order of semantic similarities to the query, such that a question having a most similar meaning to the query is selected from the preset number of questions if no question in the question and answer repository has a semantic similarity to the query greater than the preset threshold; and recommend an answer to the selected question.

In the apparatus for recommending an answer to a question based on artificial intelligence according to embodiments of the present disclosure, after the receiving module 71 receives the query inputted by a user, the query is matched to questions having answers in a question and answer repository by the matching module 72, a semantic similarity between the query and each of the questions having answers in the question and answer repository is calculated by the calculating module 73 if no question in the question and answer repository is exactly matched to the query, it is determined by the determining module 74 whether a question with a semantic similarity to the query greater than a preset threshold exists in the question and answer repository, if yes, the answer to the question with the semantic similarity to the query greater than the preset threshold is recommended by the recommending module 75 as an answer to the query, otherwise, a preset number of questions in the question and answer repository are recommended by the recommending module 75 in a descending order of semantic similarities to the query, such that a question having a most similar meaning to the query is selected from the preset number of questions and an answer to the selected question is recommended by the recommending module 75 to the user, thus realizing the recommendation of the answer to the question according to the semantic similarity, reducing a risk of misunderstanding, and reducing interference of meaningless colloquial expressions.

Figure 8:
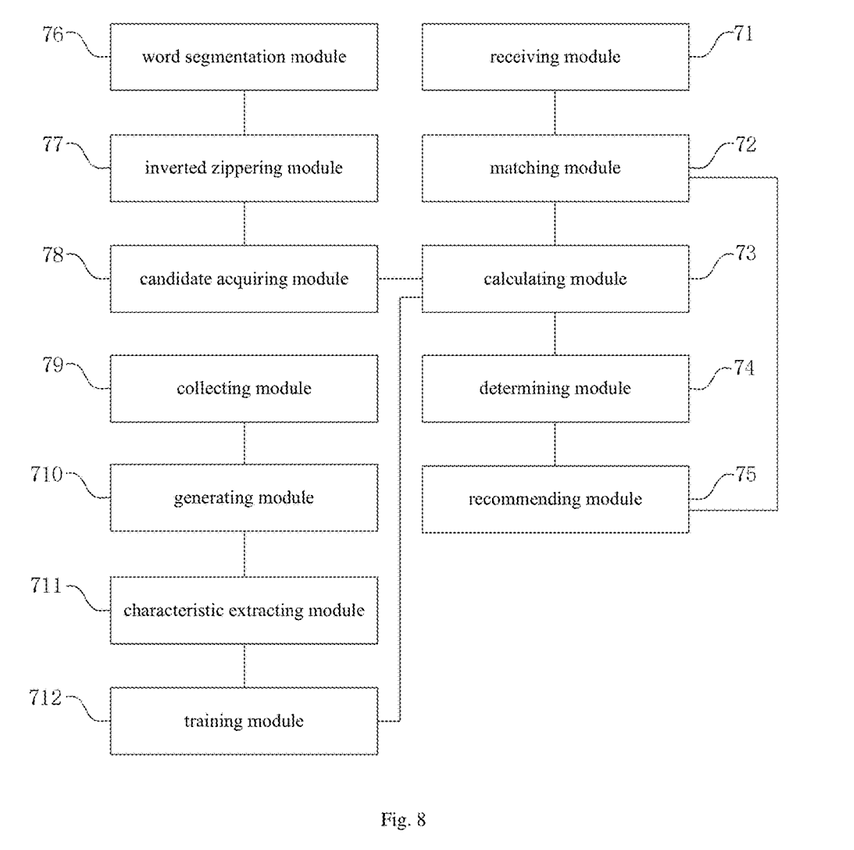
FIG. 8 is a block diagram showing an apparatus for recommending an answer to a question based on artificial intelligence according to another embodiment of the present disclosure.

FIG. 8 is a block diagram showing an apparatus for recommending an answer to a question based on artificial intelligence according to another embodiment of the present disclosure. Besides the blocks in the apparatus shown in FIG. 7, the apparatus shown in FIG. 8 further includes a word segmentation module 76, an inverted zippering module 77 and a candidate acquiring module 78.

Specifically, the word segmentation module 76 is configured to perform a word segmentation on the query to acquire word segments of the query before the semantic similarity between the query and each of the questions having answers in the question and answer repository is calculated by the calculating module 73.

The inverted zippering module 77 is configured to perform an inverted zippering on the word segments of the query acquired by the word segmentation module 76 in combination with a synonym repository, a modifier repository and a stop word repository to acquire a retrieve expression.

The candidate acquiring module 78 is configured to process the retrieve expression acquired by the inverted zippering module 77 with an inverted index and a k-channel mergence to acquire candidate similar questions in the question and answer repository.

As shown in FIG. 3, it is assumed that an answer to "What's the weather in Beijing today" has already in the repository. When a query "weather condition in Beijing today" is inputted by a user, the word segmentation may be performed on the query by the word segmentation module 76 firstly, thus acquiring word segments "weather", "condition", "in", "Beijing" and "today" included in the query, and a synonym "climate" of the word segment "weather" may be acquired from the synonym repository by the inverted zippering module 77, such that a query related to "climate" may also be taken as a candidate when extracting candidate similar questions by performing inverted zippering. Moreover, it can be known from the modifier repository that when "condition" occurs after "weather", it can be omitted, such that "condition" does not involve in extracting candidate similar questions by performing inverted zippering. In addition, it can be known from the stop word repository that "in" is a stop word, which is meaningless for semantic expression, such that "in" does not involve in extracting candidate similar questions by performing inverted zippering either. Therefore, the inverted zippering is performed on the above word segments of the query by the inverted zippering module 77 in combination with the synonym repository, the modifier repository and the stop word repository to acquire a retrieve expression "Beijing AND today AND [weather OR climate]". The retrieve expression may be processed with the inverted index and the k-channel mergence by the candidate acquiring module 78 to acquire candidate similar questions in the question and answer repository. In this example, the candidate similar questions in the question and answer repository may be "What's the weather in Beijing today", "weather in Beijing" and "today's weather".

In this embodiment of the present disclosure, the calculating module 73 is specifically configured to calculate a semantic similarity between the query and each of the candidate similar questions in the question and answer repository according to a similarity calculating model.

Specifically, the semantic similarity between the query and each of the candidate similar questions in the question and answer repository may be calculated by the calculating module 73 according to the similarity calculating model. For example, as shown in FIG. 3, semantic similarity between the query and each of the candidate similar questions in the question and answer repository is {weather condition in Beijing today, What's the weather in Beijing today}: 0.9, {weather condition in Beijing today, weather in Beijing}: 0.6, or {weather condition in Beijing today, today's weather}: 0.6.

Accordingly, only semantic similarity between the query "weather condition in Beijing today" and the question "What's the weather in Beijing today" is greater than 0.8, and thus an answer to "What's the weather in Beijing today" is recommended by the recommending module 75 to the user as the answer to "weather condition in Beijing today".

Furthermore, in embodiments of the present disclosure, the method for recommending an answer to a question based on artificial intelligence may further include a collecting module 79, a generating module 710, a characteristic extracting module 711 and a training module 712.

Specifically, the collecting module 79 is configured to collect a query pair before the semantic similarity between the query and each of the candidate similar questions in the question and answer repository is calculated by the calculating module 73 according to the similarity calculating model.

In an embodiment of the present disclosure, the query pair collected by the collecting module 79 may include similar query pairs such as "weather" and "climate", may also include dissimilar query pairs such as "weather" and "rectangle", in other words, the collected query pair may include both positive examples and negative examples, so as to be used to train the similarity calculating model.

The generating module 710 is configured to process the query pair collected by the collecting module 79 to generate a training corpus.

The characteristic extracting module 711 is configured to extract characteristics from the training corpus in combination with the synonym repository, the modifier repository and the stop word repository to acquire a repository characteristic, a semantic similarity characteristic, a literal similarity characteristic and a structural similarity characteristic of the training corpus.

The training module 712 is configured to input the repository characteristic, the semantic similarity characteristic, the literal similarity characteristic and the structural similarity characteristic of the training corpus acquired by the characteristic extracting module 711 into a GBDT model and perform a training on the GBDT model by an intelligent learning algorithm, so as to acquire the similarity calculating model.

Specifically, the intelligent learning algorithm may be a bm25 algorithm, a machine learning algorithm or other algorithms, which is not limited herein. The training process of the similarity calculating model as described above may be as shown in FIG. 5.

In such a manner, after candidate similar questions in the question and answer repository are acquired by the candidate acquiring module 78, the semantic similarity between the query and each of the candidate similar questions in the question and answer repository may be calculated by the calculating module 73 according to the similarity calculating model acquired from the training performed by the training module 712.

Further, the recommending module 75 is further configured to recommend the answer to a question exactly matched to the query if the question exactly matched to the query exists in the question and answer repository after the query is matched to questions having answers in the question and answer repository by the matching module 72.

With the apparatus for recommending an answer to a question based on artificial intelligence according to embodiments of the present disclosure, an answer may be recommended according to the semantic similarity, the risk of misunderstanding is reduced and interference of meaningless colloquial expressions is reduced.

Figure 9:
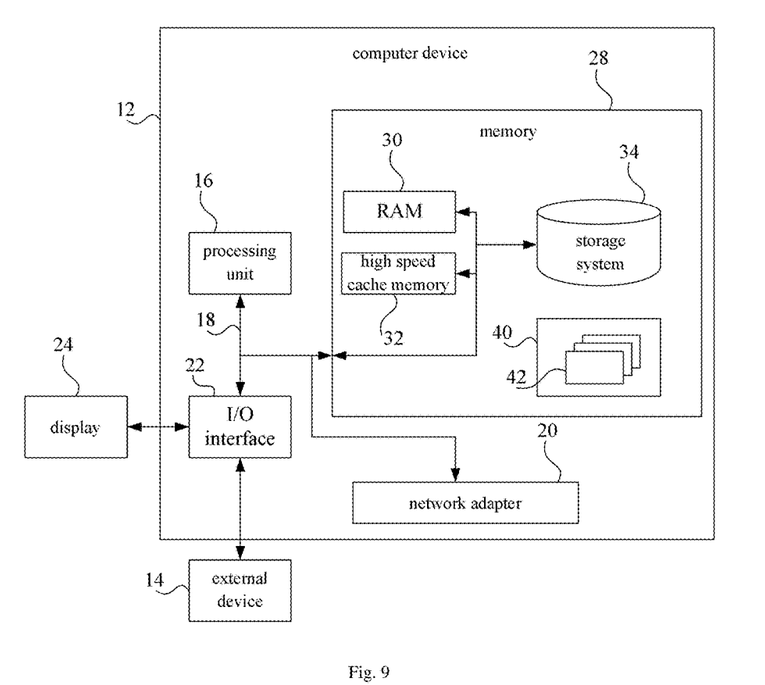
FIG. 9 is a block diagram showing a computer device according to an embodiment of the present disclosure.

FIG. 9 is a block diagram showing a computer device according to an embodiment of the present disclosure. The computer device may include a processor, and a memory having stored therein computer programs that, when executed by the processor, causes the processor to perform the method for recommending an answer to a question based on artificial intelligence as described above according to embodiments of the present disclosure.

FIG. 9 illustrates a block diagram of a computer device 12 according to an embodiment of the present disclosure, which is suitable for implement embodiments of the present disclosure as described hereinbefore. The computer device 12 shown in FIG. 9 is merely an example, which should not be considered as a limitation of function and scope of embodiments of the present disclosure.

As illustrated in FIG. 9, the computer device 12 may be represented via a general computer device form. Components of the computer device 12 may be but are not limited to one or more processors or processing units 16, a system memory 28, a bus 18 connecting various system components including the system memory 28 and the processing units 16.

The bus 18 represents one or more of several types of bus structures, including a memory bus or a memory controller, a peripheral bus, a graphics acceleration port, a processor, or a local bus using any of a variety of bus structures. For example, these architectures may be, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (hereinafter referred to as PCI) bus.

The computer device 12 typically includes a variety of computer system readable media. These media may be any available media accessible by the computer device 12 and includes both volatile and non-volatile media, removable and non-removable media.

The system memory 28 may include a computer system readable medium in the form of volatile memory, such as a random access memory 30 (hereinafter referred to as RAM) and/or a high speed cache memory 32. The computer device 12 may further include other removable or non-removable, volatile or non-volatile computer system storage media. By way of example only, the storage system 34 may be configured to read and write a non-removable and non-volatile magnetic media (not shown in FIG. 9, commonly referred to as a "hard drive"). Although not shown in FIG. 9, a magnetic disk driver for reading from and writing to a removable and non-volatile magnetic disk (such as "floppy disk") and a disk driver for a removable and non-volatile optical disk (such as compact disk read only memory (hereinafter referred to as CD-ROM), Digital Video Disc Read Only Memory (hereinafter referred to as DVD-ROM) or other optical media may be provided. In these cases, each driver may be connected to the bus 18 via one or more data medium interfaces. The memory 28 may include at least one program product. The program product has a set (such as, at least one) of program modules configured to perform the functions of various embodiments of the present disclosure.

A program/utility 40 having a set (at least one) of the program modules 42 may be stored in, for example, the memory 28. The program modules 42 include but are not limited to, an operating system, one or more application programs, other programs modules, and program data. Each of these examples, or some combination thereof, may include an implementation of a network environment. The program modules 42 generally perform the functions and/or methods in the embodiments described herein.

The computer device 12 may also communicate with one or more external devices 14 (such as, a keyboard, a pointing device, a display 24, etc.). Furthermore, the computer device 12 may also communicate with one or more communication devices enabling a user to interact with the computer device 12 and/or other devices (such as a network card, modem, etc.) enabling the computer device 12 to communicate with one or more computer devices. This communication can be performed via the input/output (I/O) interface 22. Moreover, the computer device 12 may communicate with one or more networks (such as a local area network (hereafter referred to as LAN), a wide area network (hereafter referred to as WAN) and/or a public network such as an Internet) through a network adapter 20. As shown in FIG. 9, the network adapter 20 communicates with other modules of the computer device 12 over the bus 18. It should be understood that, although not shown in FIG. 9, other hardware and/or software modules may be used in connection with the computer device 12. The hardware and/or software includes, but is not limited to, microcode, device drivers, redundant processing units, external disk drive arrays, RAID systems, Drive and data backup storage system.

The processing unit 16 is configured to execute various functional applications and data processing by running programs stored in the system memory 28, for example, implementing the method for recommending an answer to a question based on artificial intelligence provided in embodiments of the present disclosure.

Embodiments of the present disclosure provide a non-temporary computer-readable storage medium having stored therein computer programs that, when executed by a processor, causes the processor to perform the method for recommending an answer to a question based on artificial intelligence as described above.

The above non-temporary computer-readable storage medium including the computer executable instruction may adopt any combination of one or more computer readable media. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage media include (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing a program. The program may be used by an instruction executed system, apparatus or device, or a connection thereof.

The computer readable signal medium may include a data signal propagating in baseband or as part of a carrier which carries a computer readable program code. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport a program used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C++, as well as conventional Procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, in the absence of contradiction, those skilled in the art can combine the different embodiments or examples described in this specification, or combine the features of different embodiments or examples.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, for example, two or three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the order of execution is different from what is shown or discussed, including executing functions in a substantially simultaneous manner or in an opposite order according to the related functions. These and other aspects should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc It can be understood that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but is not limited to, read-only memories, magnetic disks, or optical disks.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for recommending an answer to a question based on artificial intelligence, comprising:
   receiving a query being a question;
   matching the query to questions having answers in a question and answer repository;
   calculating a semantic similarity between the query and each of the questions having answers in the question and answer repository if no question in the question and answer repository is exactly matched to the query;
   determining whether a question with a semantic similarity to the query greater than a preset threshold exists in the question and answer repository;
   if yes, recommending the answer to the question with the semantic similarity to the query greater than the preset threshold as an answer to the query;
   wherein before calculating the semantic similarity between the query and each of the questions having answers in the question and answer repository, the method further comprises:
   performing a word segmentation on the query to acquire word segments of the query;
   performing an inverted zippering on the word segments of the query in the question and answer repository in combination with a synonym repository, a modifier repository and a stop word repository to acquire a retrieve expression; and processing the retrieve expression with an inverted index and a k-channel mergence to acquire candidate similar questions in the question and answer repository, wherein calculating the semantic similarity between the query and each of the questions having answers in the question and answer repository comprises:

calculating a semantic similarity between the query and each of the candidate similar questions in the question and answer repository according to a similarity calculating model, wherein before calculating the semantic similarity between the query and each of the candidate similar questions in the question and answer repository according to the similarity calculating model, the method further comprises:

collecting a query pair;

processing the query pair to generate a training corpus;

extracting characteristics from the training corpus in combination with the synonym repository, the modifier repository and the stop word repository to acquire a repository characteristic, a semantic similarity characteristic, a literal similarity characteristic and a structural similarity characteristic of the training corpus; and inputting the repository characteristic, the semantic similarity characteristic, the literal similarity characteristic and the structural similarity characteristic of the training corpus into a gradient boosting decision tree (GBDT) model and performing a training on the GBDT model by an intelligent learning algorithm, so as to acquire the similarity calculating model.

2. The method according to claim 1, wherein after determining whether the question with the semantic similarity to the query greater than the preset threshold exists in the question and answer repository, the method further comprises:

if no question in the question and answer repository has a semantic similarity to the query greater than the preset threshold, recommending a preset number of questions in the question and answer repository in a descending order of semantic similarities to the query, such that a question having a most similar meaning to the query is selected from the preset number of questions;

recommending an answer to the selected question.

3. The method according to claim 1, wherein after matching the query to questions having answers in the question and answer repository, the method further comprises:

recommending the answer to a question exactly matched to the query if the question exactly matched to the query exists in the question and answer repository.

4. An apparatus for recommending an answer to a question based on artificial intelligence, comprising:

one or more processors;

a memory;

one or more software modules stored in the memory and executable by the one or more processors, and comprising:

a receiving module configured to receive a query being a question;

a matching module configured to match the query received by the receiving module to questions having answers in a question and answer repository;

a calculating module configured to calculate a semantic similarity between the query and each of the questions having answers in the question and answer repository if no question in the question and answer repository is exactly matched to the query;

a determining module configured to determine whether a question with a semantic similarity to the query greater than a preset threshold exists in the question and answer repository;

a recommending module configured to recommend the answer to the question with the semantic similarity to the query greater than the preset threshold as an answer to the query if the question with the semantic similarity to the query greater than the preset threshold exists in the question and answer repository;

wherein the one or more software modules further comprise:

a word segmentation module configured to perform a word segmentation on the query to acquire word segments of the query before the semantic similarity between the query and each of the questions having answers in the question and answer repository is calculated by the calculating module;

an inverted zippering module configured to perform an inverted zippering on the word segments of the query acquired by the word segmentation module in the question and answer repository in combination with a synonym repository, a modifier repository and a stop word repository to acquire a retrieve expression; and a candidate acquiring module configured to process the retrieve expression acquired by inverted zippering module with an inverted index and a k-channel mergence to acquire candidate similar questions in the question and answer repository, wherein the calculating module is specifically configured to:

calculate a semantic similarity between the query and each of the candidate similar questions in the question and answer repository according to a similarity calculating model, wherein the one or more software modules further comprise:

a collecting module configured to collect a query pair before the semantic similarity between the query and each of the candidate similar questions in the question and answer repository is calculated by the calculating module according to the similarity calculating model;

a generating module configured to process the query pair collected by the collecting module to generate a training corpus;

a characteristic extracting module configured to extract characteristics from the training corpus in combination with the synonym repository, the modifier repository and the stop word repository to acquire a repository characteristic, a semantic similarity characteristic, a literal similarity characteristic and a structural similarity characteristic of the training corpus;

a training module configured to input the repository characteristic, the semantic similarity characteristic, the literal similarity characteristic and the structural similarity characteristic of the training corpus extracted by the characteristic extracting module into a GBDT model and perform a training on the GBDT model by an intelligent learning algorithm, so as to acquire the similarity calculating model.

5. The apparatus according to claim 4, wherein the recommending module is further configured to:

recommend a preset number of questions in the question and answer repository in a descending order of semantic similarities to the query, such that a question having a most similar meaning to the query is selected from the preset number of questions if no question in the question and answer repository has a semantic similarity to the query greater than the preset threshold; and recommend an answer to the selected question.

6. The apparatus according to claim 4, wherein the recommending module is further configured to:

recommend the answer to a question exactly matched to the query if the question exactly matched to the query exists in the question and answer repository after the query is matched to questions having answers in the question and answer repository by the matching module.

7. A non-temporary computer-readable storage medium having stored therein computer programs that, when executed by a processor, causes the processor to perform a method for recommending an answer to a question based on artificial intelligence, the method comprising:

receiving a query being a question;

matching the query to questions having answers in a question and answer repository;

calculating a semantic similarity between the query and each of the questions having answers in the question and answer repository if no question in the question and answer repository is exactly matched to the query;

determining whether a question with a semantic similarity to the query greater than a preset threshold exists in the question and answer repository;

if yes, recommending the answer to the question with the semantic similarity to the query greater than the preset threshold as an answer to the query;

wherein before calculating the semantic similarity between the query and each of the questions having answers in the question and answer repository, the method further comprises:

performing a word segmentation on the query to acquire word segments of the query;

performing an inverted zippering on the word segments of the query in the question and answer repository in combination with a synonym repository, a modifier repository and a stop word repository to acquire a retrieve expression; and processing the retrieve expression with an inverted index and a k-channel mergence to acquire candidate similar questions in the question and answer repository, wherein calculating the semantic similarity between the query and each of the questions having answers in the question and answer repository comprises:

calculating a semantic similarity between the query and each of the candidate similar questions in the question and answer repository according to a similarity calculating model, wherein before calculating the semantic similarity between the query and each of the candidate similar questions in the question and answer repository according to the similarity calculating model, the method further comprises:

collecting a query pair;

processing the query pair to generate a training corpus;

extracting characteristics from the training corpus in combination with the synonym repository, the modifier repository and the stop word repository to acquire a repository characteristic, a semantic similarity characteristic, a literal similarity characteristic and a structural similarity characteristic of the training corpus; and inputting the repository characteristic, the semantic similarity characteristic, the literal similarity characteristic and the structural similarity characteristic of the training corpus into a gradient boosting decision tree (GBDT) model and performing a training on the GBDT model by an intelligent learning algorithm, so as to acquire the similarity calculating model.

8. The storage medium according to claim 7, wherein after determining whether the question with the semantic similarity to the query greater than the preset threshold exists in the question and answer repository, the method further comprises:

if no question in the question and answer repository has a semantic similarity to the query greater than the preset threshold, recommending a preset number of questions in the question and answer repository in a descending order of semantic similarities to the query, such that a question having a most similar meaning to the query is selected from the preset number of questions;

recommending an answer to the selected question.

9. The storage medium according to claim 7, wherein after matching the query to questions having answers in the question and answer repository, the method further comprises:

recommending the answer to a question exactly matched to the query if the question exactly matched to the query exists in the question and answer repository.

* * * * *